July 4, 1967 — R. D. BEITH — 3,329,468
WHEEL STRUCTURE
Filed Oct. 21, 1965 — 2 Sheets-Sheet 1

INVENTOR.
RICHARD D. BEITH
BY Ralph L. Mossino
AGENT

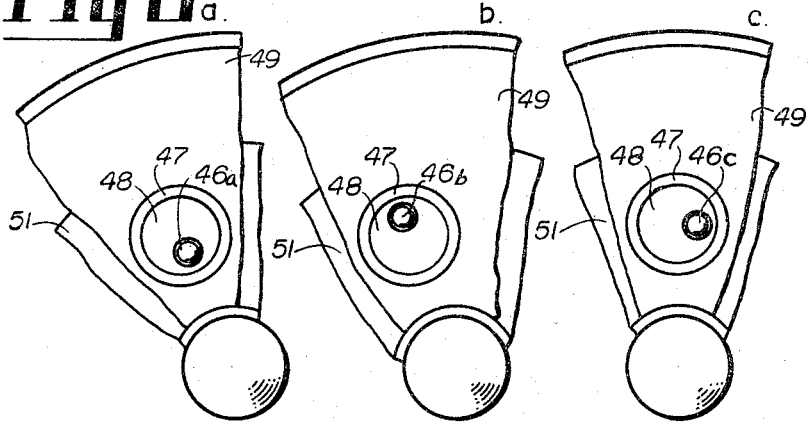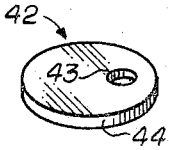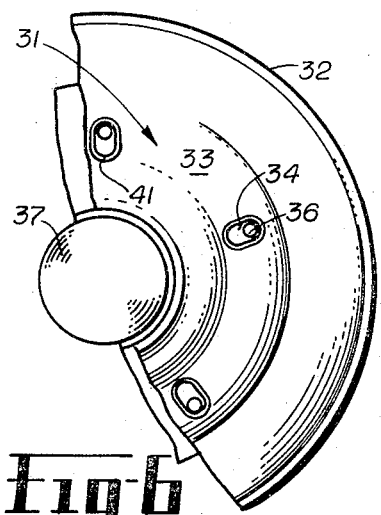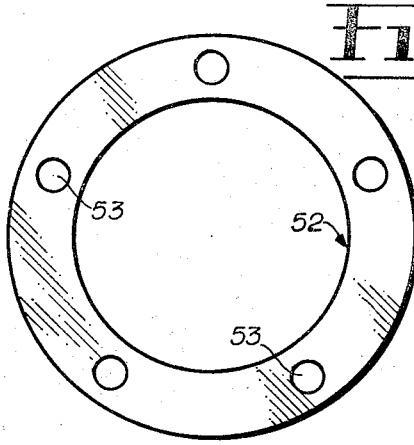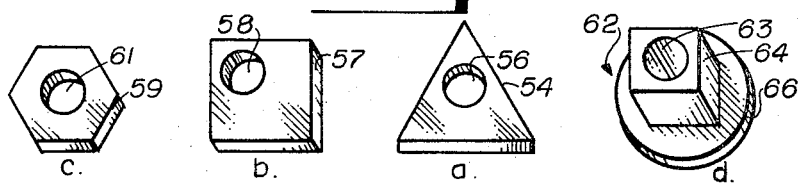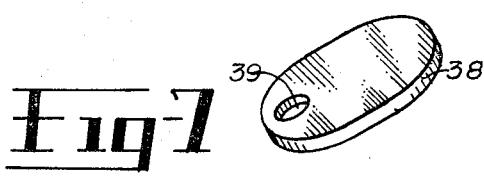

United States Patent Office 3,329,468
Patented July 4, 1967

3,329,468
WHEEL STRUCTURE
Richard D. Beith, 606 Duar Drive,
Concord, Calif. 94520
Filed Oct. 21, 1965, Ser. No. 499,745
23 Claims. (Cl. 301—9)

This application is a continuation-in-part of copending patent application Ser. No. 469,810 filed July 6, 1965. The invention relates to motor vehicular wheel structures, and particularly to a wheel universally applicable to vehicles regardless of their wheel lug bolt circle radii.

It has become popular to dress up automobiles and trucks to enhance their appearance. One of the ways in which their appearance can be enhanced is by providing a decorative wheel. Highly polished aluminum or magnesium wheels have become quite popular for this purpose. One of the disadvantages of this type wheel is its cost. Because of its construction, i.e., being sand or die cast, as a general rule, the wheels are expensive. For instance, a set of four such wheels can cost as much as two hundred dollars or more. Such costs make it prohibitive for a dealer in wheels to inventory more than one or two types which fit the most popular type automobiles, such as the lower priced makes and models.

It is not generally known that the wheels of most makes of automobiles are not interchangeable with those of other makes. There are exceptions of course, but few automobiles have wheel lug bolts arranged in bolt circles that match those of other makes of automobiles so that their wheels are interchangeable. Accordingly, it is an object of the present invention to provide a wheel which is universally applicable to many different makes of motor vehicles.

An analysis of the radii of lug bolt circles of most makes of automobiles has revealed that there are essentially three different diameter bolt circles utilized; 4½, 4¾ and 5 inches. Therefore, it is another object of this invention to provide a wheel which incorporates means for accommodating the three different diameter bolt circles of most automobiles.

Automotive wheels of the conventional type are usually manufactured in two halves, each half being stamped from sheet steel. The halves are then abutted and secured together in a suitable manner such as by welding. In this construction, the halves of the wheel are formed so that the tire flanges within which the beads of the tire are trapped are automatically formed and juxtaposed when the two halves of the wheel are assembled and welded. Another form of conventional steel wheel utilizes a toroidal tire mounting rim having flanges which are spun out to form the juxtaposed lips or flanges which lock the tire to the wheel. This toroidal tire mounting rim is commonly secured to a wheel center, or wheel mounting portion which is stamped from sheet steel and which adjacent its inner periphery is provided with a plurality of circular lug apertures arranged about a circle identical to the lug bolt circle and which about its outer periphery is secured in some suitable manner, such as welding or riveting, to the inner periphery of the toroidal tire mounting rim. Although wheels manufactured in this manner are relatively inexpensive and not decorative to the extent desired by those who wish to purchase a decorative wheel, many advantages are to be gained by the provision of a wheel capable of accommodating automobiles having different diameter lug bolt circles.

In order to achieve a decorative effect, one type of wheel forming the subject matter of this invention is formed with a cast central section which may be polished to a high luster and which may be formed in a variety of different configurations to secure the desired aesthetic effect. It is desirable however, to fabricate the tire mounting rim of the wheel from sheet steel as in the past so as to provide a strong and rigid mounting base for the tire. Since the central cast section is usually fabricated from cast aluminum or magnesium and the outer tire mounting rim is usually fabricated from sheet steel, the joining of one to the other poses a difficult problem. Accordingly, it is still another object of the invention to provide novel means for attachment of the tire mounting rim of the wheel to the cast central portion of the wheel.

The invention possesses other objects and features of advantage, some of which, with the foregoing, will become apparent from the following description and the drawings. It is to be understood however that the invention is not limited to the embodiment illustrated and described, since the invention may be embodied in various forms within the scope of the appended claims.

Referring to the drawings:

FIGURE 6 is a section of a side elevation view of a standard wheel structure constructed in accordance with the present invention.

FIGURE 7 is a perspective view of an elongated apertured washer for positioning the lug bolt within the lug aperture of the wheel structure of FIGURE 6.

Figure 1:
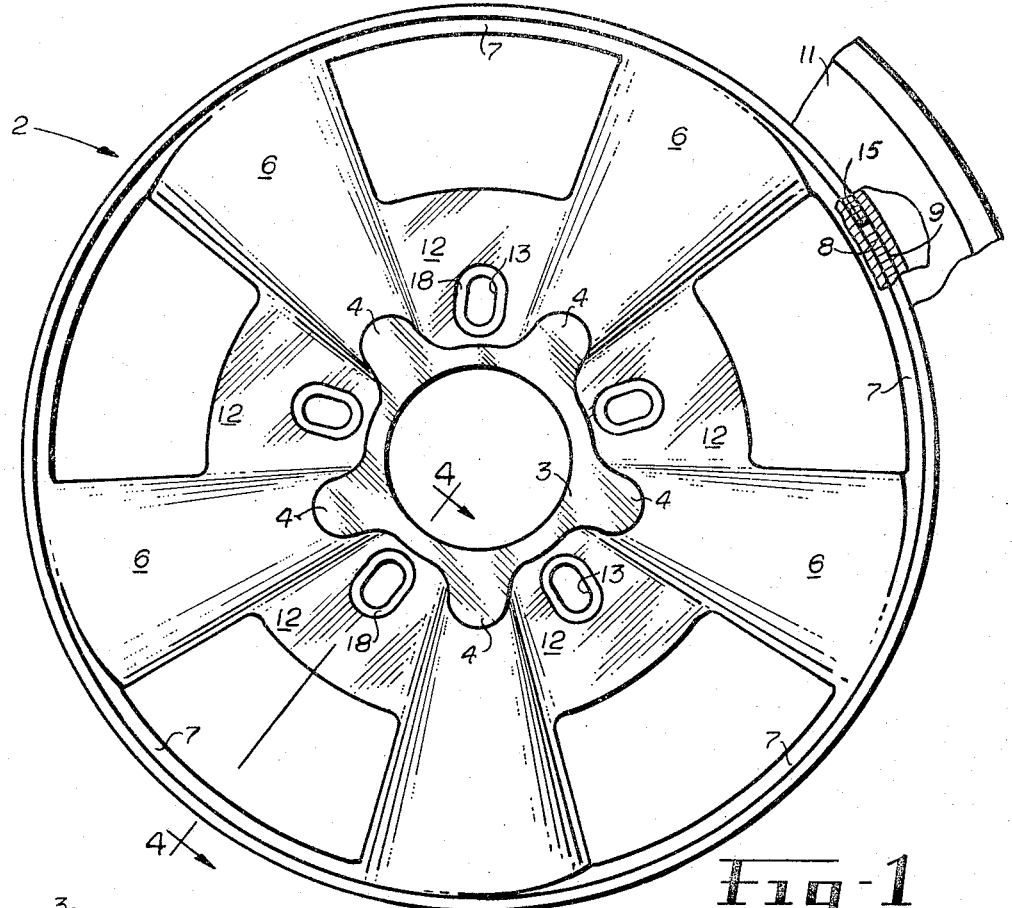
FIGURE 1 is a side elevational view of the central cast wheel mounting section of the wheel with a portion of the tire mounting rim removed to reduce the size of the figure.

FIGURE 8 is a fragmentary view illustrating the relationship between wheel fastening lug bolts of different diameter lug bolt circles and a single wheel center having oversized circular lug apertures with portion (a) showing the wheel center arranged to receive the lug bolts defining the minimum lug bolt diameter which may be accommodated by the wheel center, portion (b) showing the wheel center arranged to receive the lug bolts defining the maximum lug bolt diameter which may be accommodated by the wheel center, and portion (c) showing the wheel center arranged to receive the lug bolts defining an intermediate diameter lug bolt circle which may be accommodated by the wheel center.

FIGURE 9 is a perspective view of an apertured circular washer to be employed with the wheel center of FIGURE 8 for positioning the lug bolt within the lug aperture.

FIGURE 10 is an apertured annular member for positioning the lug bolts within the lug apertures of a wheel center.

FIGURE 11 illustrates various apertured adapters for positioning lug bolts within lug apertures with portion (a) portraying a triangular configuration, portion (b) portraying a quadrilateral configuration, portion (c) portraying a polygonal configuration, and portion (d) portraying a flanged bushing configuration.

With reference to FIGURE 6, broadly considered, the substantially universally applicable wheel structure of my invention comprises a central annular portion 31, generally metal, about which is fitted and suitably secured as by welding a flanged tire mounting rim 32. In fabricating decorative wheels, the central annular metallic portion 31 is preferably cast from a light metal such as aluminum or magnesium or other alloy and comprises an annular wheel mounting portion 33 having a plurality of circumferentially spaced lug apertures 34 therein for accommodating the lug bolts 36 which project from a standard brake drum and hub assembly 37, for instance. The size of lug apertures 34 is adjusted so that they are able to accommodate circumferentially spaced lug bolts circularly arranged in bolt circles of different radius. Although various configurations of lug apertures are suitable for practicing the present invention, for example, circular, triangular, quadrilateral or polygonal, it has been found particularly advantageous for ease of assembling as well as manufacturing to form the lug apertures 34 with an elongated or oval configuration in which the long or major axis of the aperture 34 extends radially outward from the center of the wheels.

With reference to FIGURE 7, to insure that lug bolts 36 are secured in the proper position within the oversized lug apertures 34, adapter means 38 are provided cooperating with the oblong lug apertures 34 to accommodate lug bolts 36 arranged on different diameter lug bolt circles.

More specifically, in accordance with the particular wheel structure of FIGURE 6, adapter means 38 are elongated or oval washers with an aperture 39 cut therein at a predetermined location. The location of the aperture 39 is selected in accordance with the lug bolt circle diameter characteristic of the vehicle on which the wheel of the present invention is to be mounted. One elongated washer adapter means 38 is disposed at an adapter receiving seat region about lug aperture 34 and in covering relation with each lug aperture 34 to have its apertures 39 aligned to receive therethrough lug bolts 36.

Referring again to FIGURE 6, to facilitate assembling and indexing of adapter means 38, the surface of annular wheel mounting portion 33 proximate to and defining each lug aperture 34 is rabbetted to define an elongated recess 41 circumjacent the lug aperture 34. The size of recess 41 is adjusted to snuggingly receive therein adapter means 38.

Figure 2:
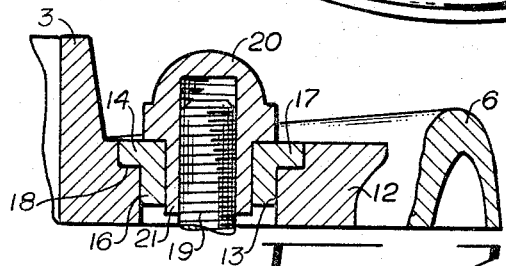
FIGURE 2 is a fragmentary sectional view showing the relationship between a wheel fastening lug and the lug aperture through which it extends. In this figure the lug is shown in a symmetrical relationship with respect to the aperture through which it extends.

In terms of greater detail, a decorative wheel structure embodiment of my invention comprises a centrally disposed cast hub or mounting portion designated generally by the numeral 2 in FIGURE 1, the central hub or mounting portion including an axially extending cylindrical section 3 defining the inner periphery of the hub and having at circumferentially equally spaced intervals a plurality of radially outwardly extending projections 4 as shown best in FIGURE 1 to strengthen and rigidify the mounting portion. The projections 4 are integral with the central axially extending cylindrical section 3. Projecting radially outwardly from each of the projections is an integral spoke 6. Each spoke is preferably formed with a semi-circular cross-section as shown in FIGURE 2 and is tapered so that its apex end is integral with the associated projection 4 and its base is integral with a circular felly 7 cast so that it ties the outer ends of the spokes 6 together into a rigid unitized structure. Embedded in the cast felly 7 adjacent one edge thereof as illustrated best in FIGURES 1 and 4, is a steel mounting band 8. The mounting band is embedded in the felly 7 with at least an axially extending surface 9 exposed so as to permit welding of the flanged tire mounting rim 11 thereto as shown in FIGURE 1. The mounting band 8 and the tire mounting rim 11 define a T joint at surface 9 of the mounting band 8. The types of welds suitable for connecting members to form a T joint are described in "Welding Handbook," edited by Arthur L. Phillips, published by American Welding Society, 1952, 5th edition, Section 1, page 1.39, FIG. 1.24. In the particular wheel structure embodiment of the present invention illustrated in FIGURES 1–4, plug or slot welds would be used to fasten the mounting band 8 to the tire mounting rim 11 since only the top surface 9 of the mounting band 8 is exposed. The design criteria for forming plug or slot welds by arc or gas welding processes is well known to those skilled in the art and is set forth in detail in "Welding Engineering" by Boniface E. Rossi, published by McGraw-Hill Book Company, Inc., 1954, p. 556. Being embedded in the cast central mounting portion, the ends of the band need not be welded since once the flanged tire mounting rim is placed around the band and welded thereto it cannot shift in any direction and forms a lock to safely secure the tire mounting rim to the wheel mounting portion. The fact that the band ends are not welded and define gap 15 serves another important function which is to permit accommodation of different rates of thermal expansion and contraction between the cast metallic wheel portion and the band during the casting process. Still another advantage flows from leaving the ends of the band free. The band possesses an inherent resilience so that it may be sprung into position in the cavity of the mold and be held there by the inherent resilience of the band during the casting process. This eliminates the necessity of using auxiliary supports for the band within the mold cavity thus facilitating fabrication. It will of course be apparent that two or more parallel bands appropriately spaced apart could be used instead of a single band.

Figure 5:
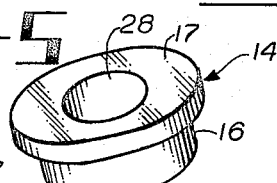
FIGURE 5 is a perspective view of the adapter shown in FIGURE 2 which is interposed between the lug nut and the wheel to provide a symmetrical positioning of the lug within the lug aperture.

In order to strengthen the integral union between the central cylindrical section 3 and the spokes 6, the sector between adjacent spokes is provided with an integral web 12 as shown best in FIGURE 1. Each web is provided adjacent its inner periphery where it unites with the cylindrical section 3 with an aperture 13 as shown which is preferably formed having an elongated or oval configuration in a direction perpendicular to the axis of the wheel and the central cylindrical section 3. In other words, the major or long axis of each oval or oblong aperture 13 extends radially away from and perpendicular to the central axis of the wheel. The mean radius of the apertures about the central axis of the wheel and the length of the apertures are proportioned so that the wheel as illustrated in FIGURE 1 will accommodate many different diameters of lug bolt circles. However, for safety reasons, it is essential that there be as little relative movement between the wheel and the lug bolts which support it as is practical to attain. It is apparent therefore, that it is desirable that the excess space in the lug aperture 13 be eliminated in some manner while permitting accommodation of the different lug bolt circle diameters. Accordingly, as illustrated in FIGURES 2 and 5, to solve this problem when the mean radius of the apertures is the same as the radius of the lug bolt circle, I provide a centrally apertured adapter 14 having an oval or oblong bushing section 16 wedged to fit snugly within the oblong lug aperture 13 and centralize the lug bolt within the aperture while filling the excess space around the lug bolt so as to preclude relative movement therebetween. The adapter 14 is also provided with a radially extending flange portion 17 proportioned to seat snugly in a rabbet 18 formed in web 12 about each aperture 13 to define a recessed adapter receiving seat region circumjacent each lug aperture. A lug nut 20 having a cylindrical sleeve or bushing portion 21 extending into the central adapter aperture is provided to secure the wheel to the lug bolt and insure that no relative movement occurs between the adapter and lug bolt. However, in those cases where the lug bolt extends beyond the surface of adapter 14, the bushing portion 21 of lug nut 20 would not be needed. Hence, the size of the central adapter aperture 28 would be adjusted to snuggingly receive the lug bolt therethrough and prevent relative movement between the adapter 14 and lug bolt.

Figure 3:
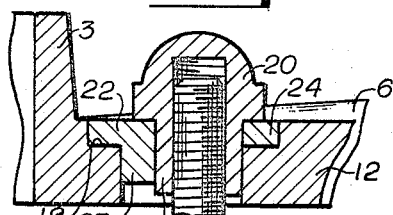
FIGURE 3 is a fragmentary sectional view illustrating another and different relationship between the lug and the aperture through which it extends. In this illustration the lug or bolt circle diameter is increased over that shown in FIGURE 2 so that the lug extends through the lug aperture nearer the peripheral portion thereof remote from the central axis of the wheel.
Figure 4:
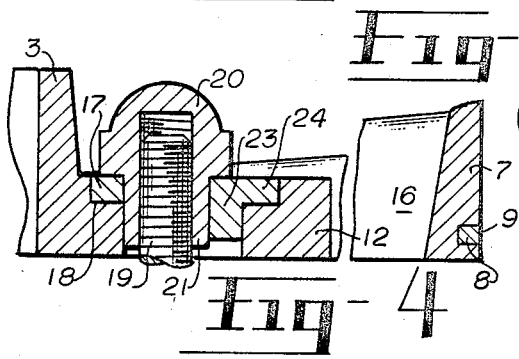
FIGURE 4 is a fragmentary sectional view in which the relationship between the lug and the aperture through which each extends is such that the apertures accommodate a lug or bolt circle of smaller diameter than the diameters shown on FIGURES 2 and 3, and in which the lug is positioned within the aperture adjacent the peripheral portion thereof next adjacent the axis of the wheel.

In order to secure the wheel to a series of lug bolts having a bolt circle of either larger diameter or smaller diameter than that illustrated in FIGURE 2, I provide a second adapter 22 illustrated in FIGURES 3 and 4. This adapter is provided with a flange or bushing portion 23 similar to the bushing 16 on adapter 14, but the bushing portion 23 of this adapter is formed with a discontinuity on one side and a thicker section on the other side to compensate for the discontinuity. Thus, when the radially extending flange portion 24 of the adapter 22 is dropped snugly into the rabbet 18 of the lug aperture so as to accommodate the largest diameter lug bolt circle, as illustrated in FIGURE 3 for instance, the thickened bushing portion 23 lies next adjacent the central axis of the wheel, and the discontinuity in the bushing permits passage of the wheel lug bolt through the lug aperture at a distance farther removed from said central axis than the mean radius of said apertures.

On the other hand, referring to FIGURE 4, when it is desired to accommodate a lug bolt circle of smaller radius than the mean radius of the lug apertures, it is merely necessary to reverse the position of the thickened bushing portion within the lug aperture so that the discontinuity therein appears next adjacent the central axis of the wheel. By providing such an adapter 22 and rabbet 18 having at least one line of symmetry transverse to the radius of the central mounting portion 2 and with the adapter aperture 28 located off the centric and the line of symmetry which can be located only perpendicular to the radius, a single adapter 22 can be employed to secure the wheel to lug bolts located on two different radii bolt circles. As will be explained in greater detail hereinafter in particular reference to FIGS. 8–9, configurations of adapters having more than two lines of symmetry will allow a single adapter to be used to secure the wheel to lug bolts located on many different radii bolt circles.

The lug nut 20 is of course proportioned so as to fit snugly within the central aperture of the adapters 14 and 22.

Referring now to FIGURES 8 and 9, a particularly versatile embodiment of the wheel structure of the present invention is illustrated. Specifically, a circular washer adapter 42 define an aperture 43 located off center proximate its periphery 44 for receiving various lug bolts 46a, 46b, and 46c therethrough. The adapter 42 is seated in a circular recess 47 circumjacent a lug aperture 48 of a wheel center 49. The size of lug aperture 48 is adjusted so that the wheel center 49 may be mounted to a brake drum and hub assembly 51 of automobiles having different diameter lug bolt circles. For example, as illustrated in FIGURE 8(a), the wheel center 49 is mounted to a brake drum and hub assembly 51 having lug bolts 46A defining the minimum diameter lug bolt circle which the wheel center can accommodate. In FIGURE 8(b), the wheel center 49 is mounted by lug bolts 46B defining the maximum diameter lug bolt circle which the wheel center can accommodate. FIGURE 8(c) portrays the wheel center 49 mounted by lug bolts 46C defining a lug bolt circle of a diameter intermediate the maximum and minimum diameter lug bolt circle which the wheel center can accommodate. From the foregoing description, it is seen that a wheel center constructed with circular lug apertures 48 and utilizing the one circular adapter 42 of FIGURE 9 can fit any size diameter lug bolt circle between a minimum and maximum. Although this embodiment is more flexible in use than the embodiment characterized in FIGURES 6–7, it should be noted that the wheel structure of FIGURES 6–7 are easier to mount on a brake drum and hub assembly. Furthermore, because of the circular geometry of the wheel center apertures recess, and the adapter of the wheel structure embodiments illustrated in FIGURES 8 and 9, the casting and machining manufacturing processes are simplified considerably.

Although the wheel structure of the present invention has been described with particular reference to three embodiments, it should be appreciated that many variations are possible, particularly in the construction of the apertured adapter for positioning the lug bolts within the lug bolt apertures, and the construction of the lug bolt apertures. For example, in FIGURE 10 an annular member adapter 52 is illustrated. The annular member 52 is provided with a series of apertures 53 circumferentially and radially spaced to receive lug bolts arranged on a bolt circle of a given mean radius. In use, the annular member 52 would be positioned over the lug apertures of a wheel center, for example, as illustrated in FIGURE 6, with their apertures 53 in alignment with the lug apertures thereof. Alternative embodiments of the lug bolt positioning adapter are illustrated in FIG. 11 which embodiments like those of FIGS. 5, 7, and 11 are of configurations such that the distance from their respective centers to their respective seating peripheries varies about the peripheries to prevent rotation of the adapters in their respective seats. For example, in FIGURE 11(a) a triangular adapter 54 having an aperture 56 for mounting to a wheel structure is illustrated. In FIGURE 11(b) a quadrilateral adapter 57 having an aperture 58 for mounting to a wheel structure is illustrated. FIGURE 11(c) illustrates a polygonal adapter 59 having an aperture 61 for mounting to a wheel structure. Of course, in all of the above examples, the particular location of the adapter apertures, i.e., 56, 58, 61, depends upon the diameter of the lug bolt circle of the brake drum and hub assembly to which the wheel structure is to be mounted. Referring to FIGURE 11(d), a circularly flanged rectangular bushing type adapter 62 having an aperture 63 is illustrated. Such an adapter 62 would be indexingly secured in position in a wheel structure having rectangular lug apertures by the rectangular bushing section 64. The circular flange section 65 serves to prevent the bushing section 64 from slipping through the lug aperture of the wheel structure. However, by tapering the bushing section 64 to have a segment slightly larger than the lug aperture and thereby prevent the bushing section 64 from passing therethrough, the flanged section 65 wouldn't be needed. Hence, it is seen many variations in lug aperture and adapter geometries are possible without departing from the scope of the invention.

It will thus be seen that my novel wheel makes it possible for a dealer in wheels to carry only one or two popular size wheels and universal sets of lug adapters to accommodate those wheels to most makes of automobiles. It should of course be understood that the invention is not limited to use on an automobile wheel but is applicable to any type wheel where universal application is useful or desired.

It should also be understood that while from the standpoint of maximum safety, it has been stated that the use of the adapters is required to eliminate the excess space about the lugs, this is not literally true, and in appropriate circumstances, such as in FIGURES 3 and 4, where the skirt or bushing portion 21 of the lug nut bears directly against the inner periphery of the lug aperture at one end and along the sides for about 180 degrees, the adapters may be dispensed with. In this view of the invention, if desired, the rabbet about the lug apertures could also be eliminated. To discard the adapters however would limit to two the number of different bolt circle diameters that could be accommodated.

What I claim is:

1. A wheel structure comprising a central wheel mounting portion having a central axis for supporting a tire thereabout and defining a series of circumferentially spaced lug apertures of a size to accommodate lug bolts circularly arranged in bolt circles of different radii and an adapter receiving seat region about the lug apertures, adapter means snugly seated in said seat region in covering relation with said lug apertures and defining apertures aligned with the lug apertures for receiving therethrough lug bolts in a bolt circle of a selected radius, the adapter receiving seat region and adapter means formed to allow the seat region to snugly receive the adapter means in at least two orientations, said adapter means defining the adapter apertures to be located at a different radial distance from the central axis for each orientation in which the adapter means is seated.

2. The wheel structure according to claim 1 wherein said central wheel mounting portion defines an adapter receiving seat region separately about each lug aperture, and said adapter means is a washer defining a washer aperture snugly seated in each seat region in covering relation with each lug aperture.

3. The wheel structure according to claim 2 wherein said lug apertures and said washers are elongated.

4. The wheel structure according to claim 2 wherein said lug apertures and said washers are circular.

5. The wheel structure according to claim 2 wherein said lug apertures and said washers are multisided.

6. The wheel structure according to claim 2 wherein said adapter means further comprising a bushing section integrally secured to each washer and snugly inserted within each lug aperture to snugly seat the washers in the seat regions, said bushing section defining a bushing aperture in alignment with said washer aperture.

7. The wheel structure according to claim 2 wherein a portion of the surface of said central wheel mounting portion circumjacent said lug apertures is rabbetted to define a recessed adapter receiving seat region to snugly receive said washer.

8. The wheel structure according to claim 7 wherein said adapter means further comprises a bushing section integrally secured to each washer and snugly inserted within each lug aperture, said bushing section defining a bushing aperture in alignment with said washer aperture.

9. The wheel structure according to claim 1 wherein a tire mounting rim is secured about the central wheel mounting portion for receiving said tire.

10. The wheel structure according to claim 9 wherein said lug apertures are elongated and a portion of the surface of said central wheel mounting portion circumjacent said lug apertures is rabbetted to define an elongated recessed adapter receiving seat region, and said adapter means is an elongated washer defining a washer aperture snugly seated in said elongated recessed seat.

11. The wheel structure according to claim 1 wherein said central wheel mounting portion has a felly portion about its periphery, and a weldable mounting band is embedded in said felly portion with a surface thereof exposed for welding to a tire mounting rim.

12. The wheel structure according to claim 11 wherein said mounting band is discontinuous to define a space between adjacent ends thereof.

13. The wheel structure according to claim 11 wherein said central wheel mounting portion is fabricated from non-ferrous material, said mounting band is fabricated from ferrous material, and including a ferrous tire mounting rim welded to said mounting band.

14. The wheel structure according to claim 11 wherein said central wheel mounting portion includes a hub portion and circumferentially spaced radially extending spokes fixedly interposed the hub portion and the felly portion.

15. A wheel structure comprising a central wheel mounting portion for supporting a tire about a central axis defining a series of circumferentially spaced lug apertures of a size to accommodate lug bolts circularly arranged in bolt circles of different radii and an adapter receiving seat region about each of the lug apertures, an adapter snugly seated in each seat region in covering relation with said lug apertures and defining an aperture aligned with the lug aperture for receiving therethrough lug bolts in a bolt circle of a selected radius, said adapter seat region and juxtaposed adapter portion of a configuration such that the distance from their respective centers to their respective peripheries varies about their peripheries thereby preventing rotation of said adapter in said seat.

16. The wheel structure according to claim 15 wherein a portion of the surface of said wheel center circumjacent said lug apertures is rabbetted to define a recessed adapter receiving seat region, and at least one of either said series of recessed seat regions and said series of lug apertures of a configuration such that the distance from their respective centers to their respective peripheries varies about their peripheries.

17. The wheel structure according to claim 16 wherein said rabbetted portion is elongated, and each of said adapters is an elongated washer defining a washer aperture snugly seated in said elongated recessed seat region.

18. The wheel structure according to claim 15 wherein said adapters are apertured washers, and further comprising a bushing section integrally joined to each washer and snugly inserted within each lug aperture to snugly seat the washers in the seat regions, said bushing section defining a bushing aperture in alignment with said washer aperture.

19. The wheel structure according to claim 15 wherein a tire mounting rim is secured about the central wheel mounting portion for securing said tire.

20. The wheel structure according to claim 19 wherein said central wheel mounting portion has a felly portion about the periphery, and a weldable mounting band is embedded in said felly portion with a surface thereof exposed, said rim welded to said mounting band.

21. The wheel structure according to claim 20 wherein said mounting band is discontinuous to define a space between adjacent ends thereof.

22. The wheel structure according to claim 20 wherein said central wheel mounting portion includes a hub portion and circumferentially spaced radially extending spokes fixedly interposed the hub portion and the felly portion.

23. A wheel structure comprising a non-ferrous central wheel mounting portion disposed about a central axis, a felly portion concentrically disposed about said central wheel mounting portion in radially spaced relation thereto, a ferrous mounting band embedded in said felly portion to have a single axially extending peripheral surface thereof exposed, said band having a single discontinuous portion defining a space between adjacent ends thereof, and a ferrous tire mounting rim welded to the exposed surface of said mounting band.

References Cited

UNITED STATES PATENTS

| | | | |
|---|---|---|---|
| 2,008,933 | 7/1935 | Sinclair | 301—65 |
| 2,164,883 | 7/1939 | Moore | 301—6 |
| 2,439,881 | 4/1948 | Ash | 301—65 |
| 2,590,363 | 3/1952 | Adair | 301—9 |
| 3,006,443 | 10/1961 | Siler | 189—36 |
| 3,025,109 | 3/1962 | Martin | 301—9 |
| 3,166,357 | 1/1965 | Vachon | 301—63 X |
| 3,207,557 | 9/1965 | Hunter | 301—5 |
| 3,250,571 | 5/1966 | Richter | 301—65 |
| 3,250,572 | 5/1966 | Walker | 301—65 |

FOREIGN PATENTS

| | | |
|---|---|---|
| 613,808 | 9/1926 | France. |
| 387,086 | 2/1933 | Great Britain. |
| 859,193 | 1/1961 | Great Britain. |
| 579,294 | 5/1958 | Italy. |

BENJAMIN HERSH, *Primary Examiner.*

RICHARD J. JOHNSON, *Examiner.*